(12) United States Patent
Jarrar et al.

(10) Patent No.: US 10,754,740 B2
(45) Date of Patent: Aug. 25, 2020

(54) DYNAMIC SUPPRESSION OF ERROR DETECTION IN PROCESSOR SWITCH FABRIC

(71) Applicant: NXP USA, Inc., Austin, TX (US)

(72) Inventors: Anis Mahmoud Jarrar, Austin, TX (US); Nancy Hing-Che Amedeo, Austin, TX (US); John F. West, Austin, TX (US)

(73) Assignee: NXP USA, Inc., Austin, TX (US)

( * ) Notice: Subject to any disclaimer, the term of this patent is extended or adjusted under 35 U.S.C. 154(b) by 159 days.

(21) Appl. No.: 15/906,093

(22) Filed: Feb. 27, 2018

(65) Prior Publication Data

US 2019/0266060 A1  Aug. 29, 2019

(51) Int. Cl.
*G06F 11/00* (2006.01)
*G06F 11/16* (2006.01)

(52) U.S. Cl.
CPC .... *G06F 11/1641* (2013.01); *G06F 2201/805* (2013.01); *G06F 2201/82* (2013.01)

(58) Field of Classification Search
CPC .......................... G06F 11/1629; G06F 11/1641
See application file for complete search history.

(56) References Cited

U.S. PATENT DOCUMENTS

| | | | | |
|---|---|---|---|---|
| 7,287,185 B2* | 10/2007 | Safford | ............... | G06F 9/30076 714/10 |
| 7,669,079 B2* | 2/2010 | Weiberle | ............. | G06F 9/30076 714/10 |
| 8,051,323 B2* | 11/2011 | Pathirane | ............ | G06F 9/30189 714/10 |
| 8,595,671 B2* | 11/2013 | He | ....................... | G06F 17/5054 716/116 |
| 9,436,623 B2 | 9/2016 | Wetheimer et al. | | |
| 9,524,261 B2 | 12/2016 | Saund et al. | | |
| 9,891,917 B2* | 2/2018 | Hastie | ................... | G06F 9/3005 |
| 2010/0005218 A1* | 1/2010 | Gower | ............... | G06F 13/4234 711/5 |
| 2010/0218022 A1* | 8/2010 | Matsuyama | ........ | G06F 9/30189 713/323 |
| 2012/0226949 A1 | 9/2012 | Palus et al. | | |
| 2016/0055047 A1* | 2/2016 | Okamoto | ............ | G06F 11/1687 714/57 |
| 2016/0110275 A1* | 4/2016 | Michalovich | ....... | G06F 11/3656 714/43 |
| 2016/0301614 A1* | 10/2016 | Concer | ............... | H04L 47/6215 |

* cited by examiner

*Primary Examiner* — Elmira Mehrmanesh

(57) ABSTRACT

A processing system tags read and write transaction packets that are functionally safe and suppresses redundant processing and error checking for functionally safe tagged transaction packets. The processing system includes compute elements that are interconnected via an interconnect fabric that includes resources to route operations. The interconnect fabric includes redundant resources to execute the same routing operations and comparator elements to indicate an error in response to detecting a mismatch between the output of a resource and its corresponding duplicate resource. The interconnect fabric selectively activates the duplicate resources and comparator elements in response to a tag associated with a transaction packet indicating that the transaction packet is safety-critical.

18 Claims, 4 Drawing Sheets

DYNAMIC SUPPRESSION OF ERROR DETECTION IN PROCESSOR SWITCH FABRIC

BACKGROUND

Field of the Disclosure

The present disclosure relates generally to low power implementation of error detection in systems on a chip.

Description of the Related Art

A processing system, such as, for example, a network on a chip (NoC) or a system on a chip (SoC) typically utilizes error detection and correction techniques to ensure data reliability and thereby ensure proper operation. For example, a processing system implements redundancies across resources of an interconnect of the processing system, such as framing modules, routing modules, and other elements to check for errors in data and computations. Each resource of the interconnect is duplicated, and the outputs of the resources of the interconnect and duplicate resources executing the same operation are compared to identify discrepancies. However, the duplicate modules can strain the power budget for the processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
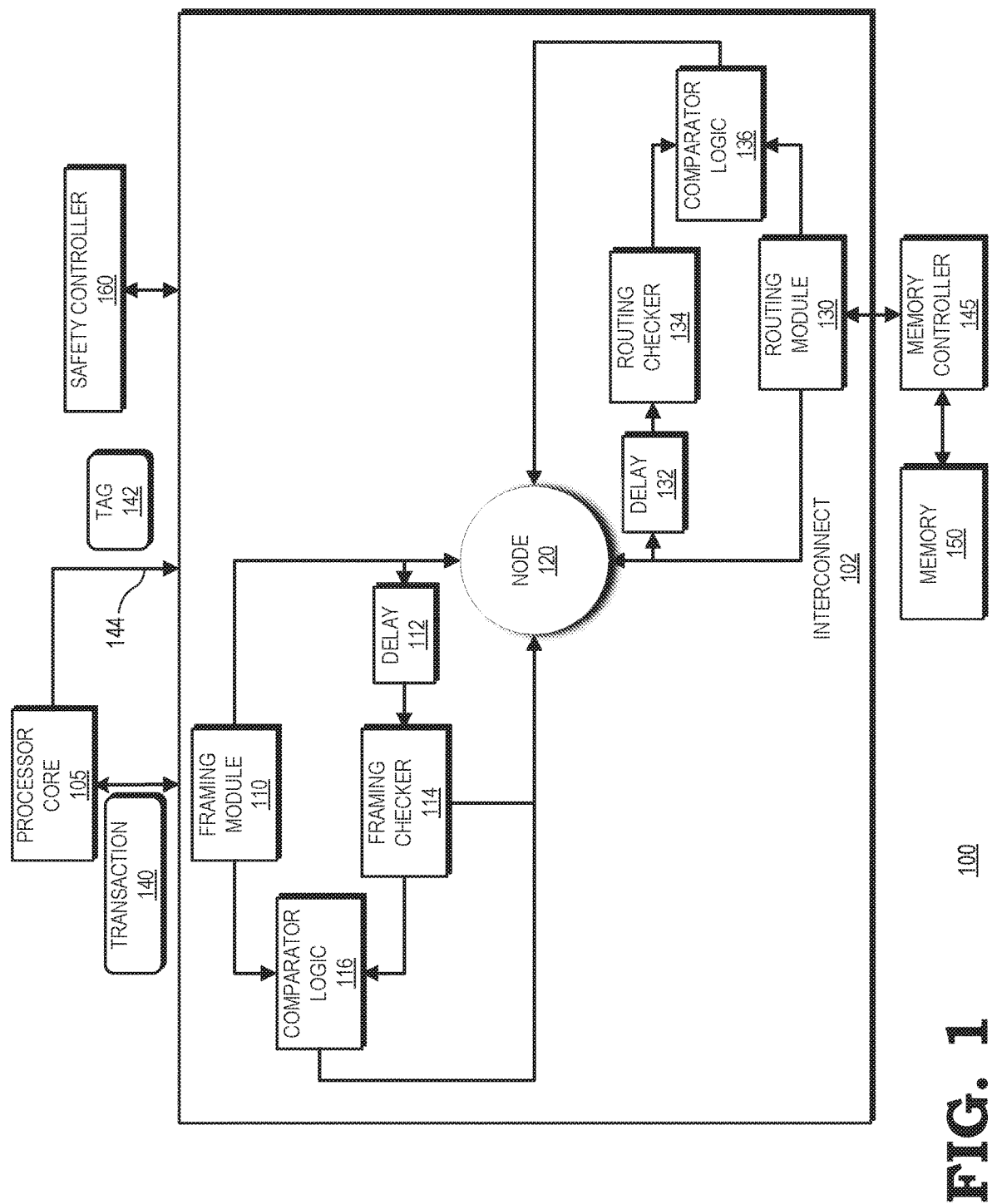
FIG. 1 is a block diagram illustrating a processing system implementing an interconnect to selectively activate error detection in accordance with some embodiments.

FIGS. 1-4 illustrate techniques for improving processing efficiency at a processing system by tagging read and write transactions that are functionally safe (i.e., that do not require redundancy to improve safety) and suppressing redundant processing and error checking for functionally safe tagged transactions. The processing system includes compute elements such as processor cores to execute instructions and a memory hierarchy having memory components such as a memory controller and one or more volatile and/or non-volatile memory modules to store data to be accessed by the executing instructions. The compute elements are interconnected via an interconnect (also referred to as a switch fabric or interconnect fabric). The data that is the subject of a transaction is divided into packets, referred to as transaction packets. To achieve functional safety for safety-critical operations such as vehicle braking, resources of the interconnect are duplicated to protect critical systems from latent manufacturing defects and soft errors generated from alpha particles and cosmic neutrons. The interconnect includes redundant (i.e., duplicate) resources to execute the same routing operations and comparator elements to indicate an error in response to detecting a mismatch between the output of a resource and its corresponding duplicate resource. To improve processing efficiency, the interconnect selectively activates the duplicate resources and comparator elements in response to a tag associated with a transaction indicating that the transaction is safety-critical. By suppressing activation of the duplicate resources and comparator elements in response to the tag indicating that an associated transaction is non-safety-critical, the interconnect conserves power consumption by the processing system.

In some embodiments, each transaction packet for a given transaction is associated with a tag that indicates the safety-criticality of the transaction packet. In some embodiments the tags are automatically generated by the interconnect based on a location in memory of data associated with the transaction packet. In some embodiments, the tags are coded in software on a routine-by-routine basis. For example, a transaction directed to a routine for controlling non-mission critical operation is tagged as non-safety-critical, whereas a transaction directed to a routine for controlling steering or braking of a vehicle is tagged as safety-critical. In some embodiments, the tag associated with a transaction packet is communicated via a sideband signal or bus that moves with the transaction packet through the processing system. In response to a tag indicating that an associated transaction packet is non-safety-critical, the interconnect dynamically suppresses duplication and comparison in one or both of the duplicate resources and comparison elements. In some embodiments, the interconnect suppresses activation of the duplication and comparison by clock gating one or both of the duplicate resources and comparison elements. In some embodiments, if the tag associated with the transaction packet indicates that the transaction packet is non-safety-critical, and that execution of the transaction packet is expected to take longer than a threshold amount of time, the interconnect shuts off power to one or both of the duplicate resources and comparison elements.

FIG. 1 illustrates a processing system 100 that dynamically suppresses redundant interconnect processing and error checking for functionally safe tagged transactions. The processing system 100 is generally configured to execute sets of instructions organized in the form of computer programs in order to carry out tasks on behalf of an electronic device. Accordingly, the processing system 100 may be used in any of a variety of electronic devices, such as automobiles, airplanes, boats, other vehicles, appliances, and other machinery.

To facilitate execution of instructions, the processing system 100 includes a processor core 105, a memory 150, a memory controller 145, an interconnect 102, and a safety controller 160. The processor core 105 includes an instruction pipeline having, for example, a fetch stage to fetch instructions, a decode stage to decode each fetched instruction into one or more operations, execution stages to execute the operations, and a retire stage to retire instructions whose operations have completed execution. One set of operations generated based on the instructions are referred to herein as memory access instructions, which are requests to load data (load operations) from the memory 150 of the processing system 100, and requests to store data (store operations) at the memory 150 of the processing system 100.

The memory 150 is a memory device generally configured to store data. The memory 150 is depicted in FIG. 1 as a single module, but in some embodiments, the memory 150 includes a hierarchy of caches and a system memory, each of which may be random access memory (RAM) memory modules, non-volatile memory devices (e.g., flash memory), and the like. Each module of the memory 150 includes a plurality of entries, whereby each entry is associated with one or more addresses of the memory 150. In response to a memory access request, the memory controller 145 reviews the data stored at one or more entries of the memory 150 to determine if any of the entries stores data associated with the memory address targeted by the memory access request. If so, the memory controller 145 satisfies the memory access request at the identified entry, either by storing data at the entry (in the case of a store operation) or by providing the data at the identified entry to the processor core 105 (in the case of a load operation).

The memory controller 145 provides an interface for the processor core 105 to communicate with the memory 150. The memory controller 145 receives memory access requests from the interconnect 102 and controls provision of those requests to the memory 150. In addition, the memory controller 145 receives responses to memory access requests from the memory 150 and controls provision of the responses to the interconnect 102.

The interconnect 102 is an interconnect fabric configured to interconnect the processor core 105 and the memory controller 145 and other blocks or logical groups of circuitry that serve one or more targeted functions, also referred to as compute elements or modules. Logical groups of circuitry (also referred to as logical circuitry) refers to one or more circuits configured to perform logical operations that effect the functions and operations of the corresponding module. In some embodiments, the interconnect 102 includes multiple point-to-point interconnects, such as node 120, between different compute modules. In some embodiments, the interconnect 102 is a cross-bar type interconnect or a ring-type interconnect that includes multiple interconnect segments coupled between nodes on the ring that are coupled to the different compute modules.

The interconnect 102 routes transactions such as transaction 140 between compute modules such as the processor core 105 and the memory controller 145 via a network of nodes, such as node 120. To facilitate routing of transactions, the interconnect 102 includes a plurality of resources, such as framing module 110 and routing module 130. In some embodiments, the framing module 110 divides data associated with the transaction 140 into frames. In some embodiments, the framing module 110 divides data associated with the transaction 140 into packets. Each frame or packet of data is routed through the interconnect 102 among a plurality of nodes. The routing module 130 maintains a routing table (not shown) that includes routing rules and routing paths to route frames or packets between nodes of the interconnect 102.

To detect errors affecting safety-critical instructions, the interconnect 102 includes a framing checker 114 and comparator logic 116, which are configured to detect errors in operations executed by the framing module 110, and a routing checker 134 and comparator logic 136, which are configured to detect errors in operations executed by the routing module 130. The framing checker 114 executes the same operations using the same data as the framing module 110, and the outputs of both the framing module 110 and the framing checker 114 are provided to the comparator logic 116. The comparator logic 116 compares the output from the framing module 110 and the output from the framing checker 114. If the comparator logic 116 detects a mismatch between the outputs, the comparator logic 116 asserts a signal to the safety controller 160 indicating an error.

Similarly, the routing checker 134 duplicates the functionality of the routing module 130, and the outputs of both the routing module 130 and the routing checker 134 are provided to the comparator logic 136. The comparator logic 136 compares the output from the routing module 130 and the routing checker 134. If the comparator logic 136 detects a mismatch between the outputs, the comparator logic 136 asserts a signal to the safety controller 160 indicating an error.

The safety controller 160 is a hardware and/or software module configured to receive and collect signals indicating errors from the comparator logics 116 and 136. In response to receiving a signal indicating an error from one of the comparator logics 116 and 136, the safety controller 160 determines and executes a response, such as ignoring the error, correcting the error, or generating an interrupt or system reset.

To improve processing efficiency and conserve power, the processor core 105 generates a tag 142 associated with a transaction 140 that is the subject of an instruction (not shown) that invokes the framing module 110 and the routing module 130. The tag 142 indicates whether the transaction is safety-critical. If the tag 142 indicates that the transaction is non-safety-critical, the interconnect 102 suppresses activation of the comparator logic 116 and the comparator logic 136. In some embodiments, the interconnect 102 also suppresses activation of the framing checker 114 and the routing checker 134 in response to the tag 142 indicating that the transaction 140 is non-safety-critical. In some embodiments, the tag 142 is automatically generated based on a location in memory 150 of the data associated with the transaction 140. For example, in some embodiments, specified addresses in memory 150 are designated for storing non-safety-critical data. If data associated with a transaction 140 is stored at an address designated for non-safety-critical data, the memory controller 145 generates the tag 142 indicating that a transaction 140 that uses the non-safety-critical data is non-safety-critical. In other embodiments, the tag 142 indicating that a routine or instruction is non-safety-critical is based on an instruction.

In some embodiments, the tag 142 further indicates an expected duration of execution of the transaction 140 associated with the tag 142. If the expected duration is longer than a threshold amount of time, such that the power savings of shutting off power to the redundant interconnect resources is greater than the energy consumption during power up, the interconnect 102 shuts power to the comparator logic 116 and the comparator logic 136 in response to the tag 142. In some embodiments, if the tag 142 indicates that the expected duration is longer than the threshold amount of time, the interconnect 102 also shuts power to the framing checker 114 and the routing checker 134.

In some embodiments, the processor core 105 communicates the tag 142 to the interconnect 102 via a sideband bus 144. The sideband bus 144 allows the tag 142 to move with the transaction 140 through the interconnect 102. In some embodiments, the sideband bus 144 is configurable to carry additional transaction information related to the transaction 140. In some embodiments, the sideband bus 144 is sampled by the interconnect 102 with standard protocol bus signals on each transaction.

In some embodiments, a delay 112 delays execution of an operation by the framing checker 114 by at least one clock cycle after execution of the operation by the framing module 110. Delaying execution of the operation by the framing checker 114 allows the interface 102 time to clock gate the framing checker 114 in response to the tag 142 associated with the transaction 140 indicating that the operation is non-safety-critical. Similarly, in some embodiments, a delay 132 delays execution of an operation by the routing checker 134 by at least one clock cycle after execution of the operation by the routing module 130 to allow time for the interconnect 102 to clock gate the routing checker 134 in response to the tag 142 associated with the transaction 140 indicating that the operation is non-safety-critical.

Figure 2:
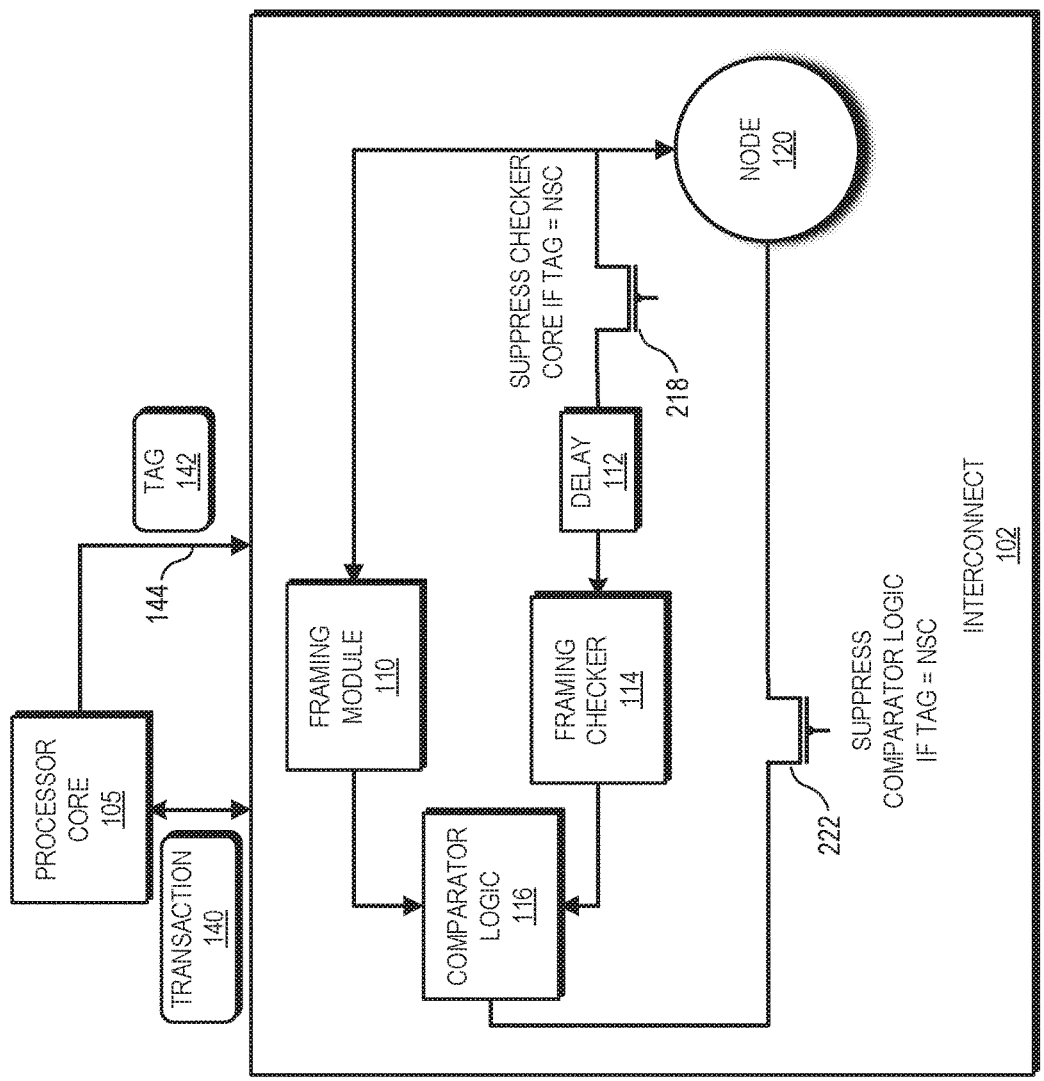
FIG. 2 is a block diagram illustrating an interconnect selectively suppressing redundant interconnect processing and error detection in accordance with some embodiments.

FIG. 2 illustrates an example of the interconnect 102 of FIG. 1 selectively suppressing redundant interconnect processing and error detection in accordance with some embodiments. In the depicted example, the interconnect 102 includes clock gating logic 218 between the node 120 and the framing checker 114 and clock gating logic 222 between the node 120 and the comparator logic 116. The interconnect 102 further includes a delay 112 between the clock gating logic 218 and the framing checker 114.

The interconnect 102 is configured to receive a transaction 140 and an associated tag 142 via a sideband bus 144 from the processor core 105. The framing module 110 executes a framing operation specified by the transaction 140 to generate an output (not shown). The delay 112 delays the framing checker 114 from executing the framing operation until at least one clock cycle after framing module 110 executes the operation. During the delay, the interconnect 102 determines based on the tag 142 if the transaction 140 is safety-critical. If the transaction 140 is safety-critical, the interconnect selectively activates the framing checker 114 to execute the same framing operation for the transaction 140 as the framing module 110 and generate a checker output (not shown). The output and the checker output are both input to the comparator logic 116. The comparator logic 116 compares the output and the checker output to determine if they are equal.

If the tag 142 indicates that the transaction 140 is non-safety-critical (NSC), the interconnect 102 activates the clock gating logic 222 to suppress activation of the comparator logic 116. In some embodiments, if the tag 142 indicates that the transaction 140 is non-safety-critical, the interconnect 102 activates the clock gating logic 218 to suppress activation of the framing checker 114. In this way, the interconnect 102 conserves power by deactivating at least one of the comparator logic 116 and the framing checker 114 for transactions that are non-safety-critical. In some embodiments, if the tag 142 indicates that processing of the transaction 140 is expected to take longer than a threshold amount of time, the interconnect 102 shuts power to one or both of the comparator logic 116 and the framing checker 114.

Figure 3:
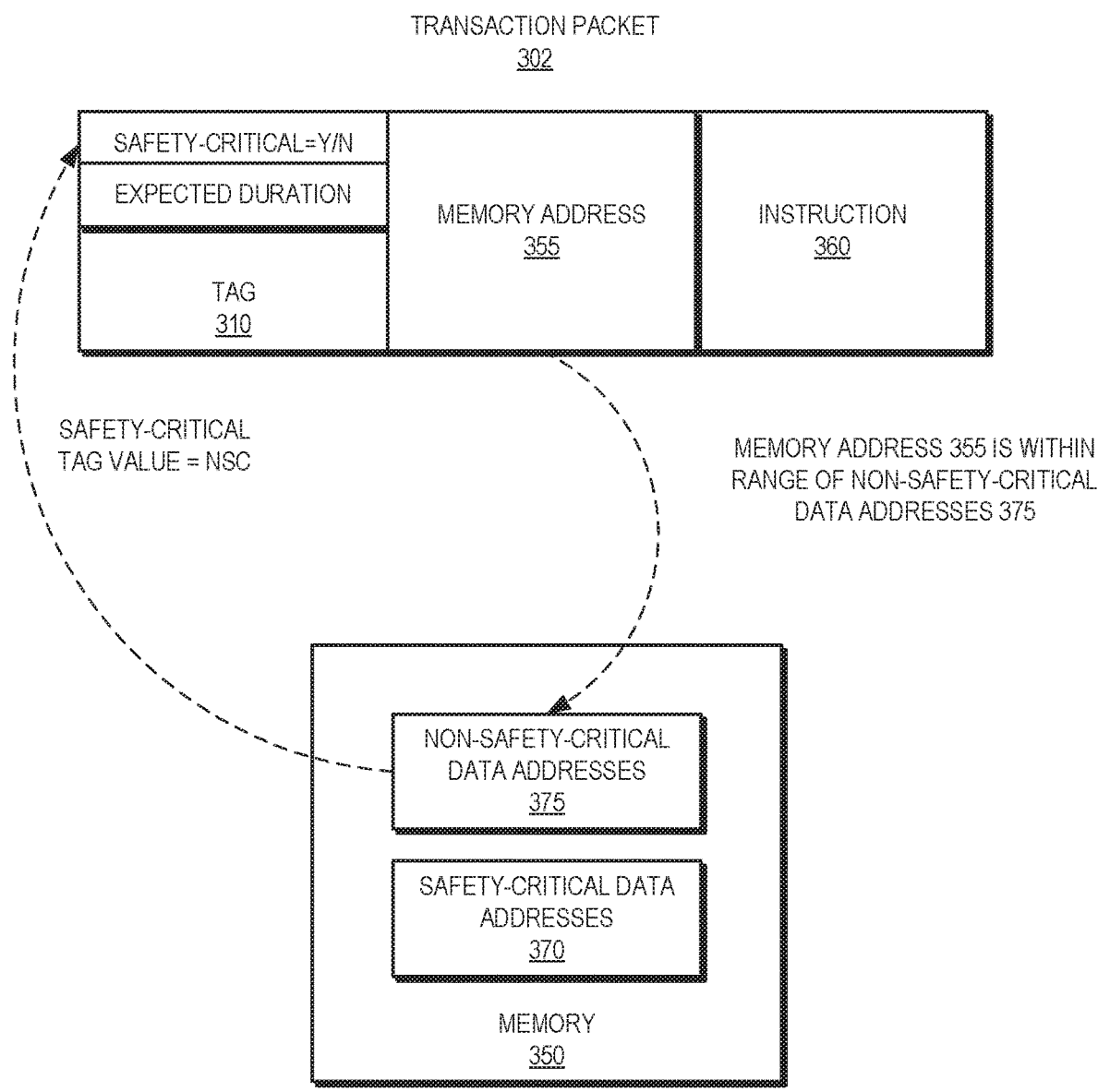
FIG. 3 is a block diagram illustrating generation of a tag value to indicate whether an associated transaction packet is safety critical in accordance with some embodiments.

FIG. 3 illustrates an example of generation of a tag value to indicate whether a transaction associated with a transaction packet is safety-critical in accordance with some embodiments. As depicted in FIG. 3, a transaction packet 302 includes a tag 310, a memory address 355 of associated data, and an instruction 360 that includes one or more operations. Also depicted in FIG. 3 is a memory 350, which includes a set of non-safety-critical addresses 375 and a set of safety-critical addresses 370.

The tag 310 includes fields for an indication of safety-criticality of the transaction packet 302 and the expected duration of the transaction packet 302. In some embodiments, the safety-criticality indication of the transaction packet 302 is automatically generated based on the location in the memory 350 of the memory address 355 of data associated with the transaction packet 302. Thus, if the memory address 355 is within the range of non-safety-critical data addresses 375, the safety-critical indication of the tag 310 is set to N (non-safety-critical). Conversely, if the memory address 355 is within the range of safety-critical data addresses 370, the safety-critical indication of the tag 310 is set to Y (safety-critical).

The expected duration field of the tag 310 indicates the amount of time execution of the operations invoked by the instruction 360 is expected to take. In some embodiments, the expected duration field of the tag 310 indicates whether the amount of time execution of the operations invoked by the instruction 360 exceeds a threshold (not shown). The threshold represents a length of time that justifies shutting power to one or more of, e.g., the comparator logic 116 and framing checker 114, and the comparator logic 136 and routing checker 134 of FIG. 1 in view of energy that will be consumed during power up of the resources that are shut off during processing of the transaction packet 302.

Figure 4:
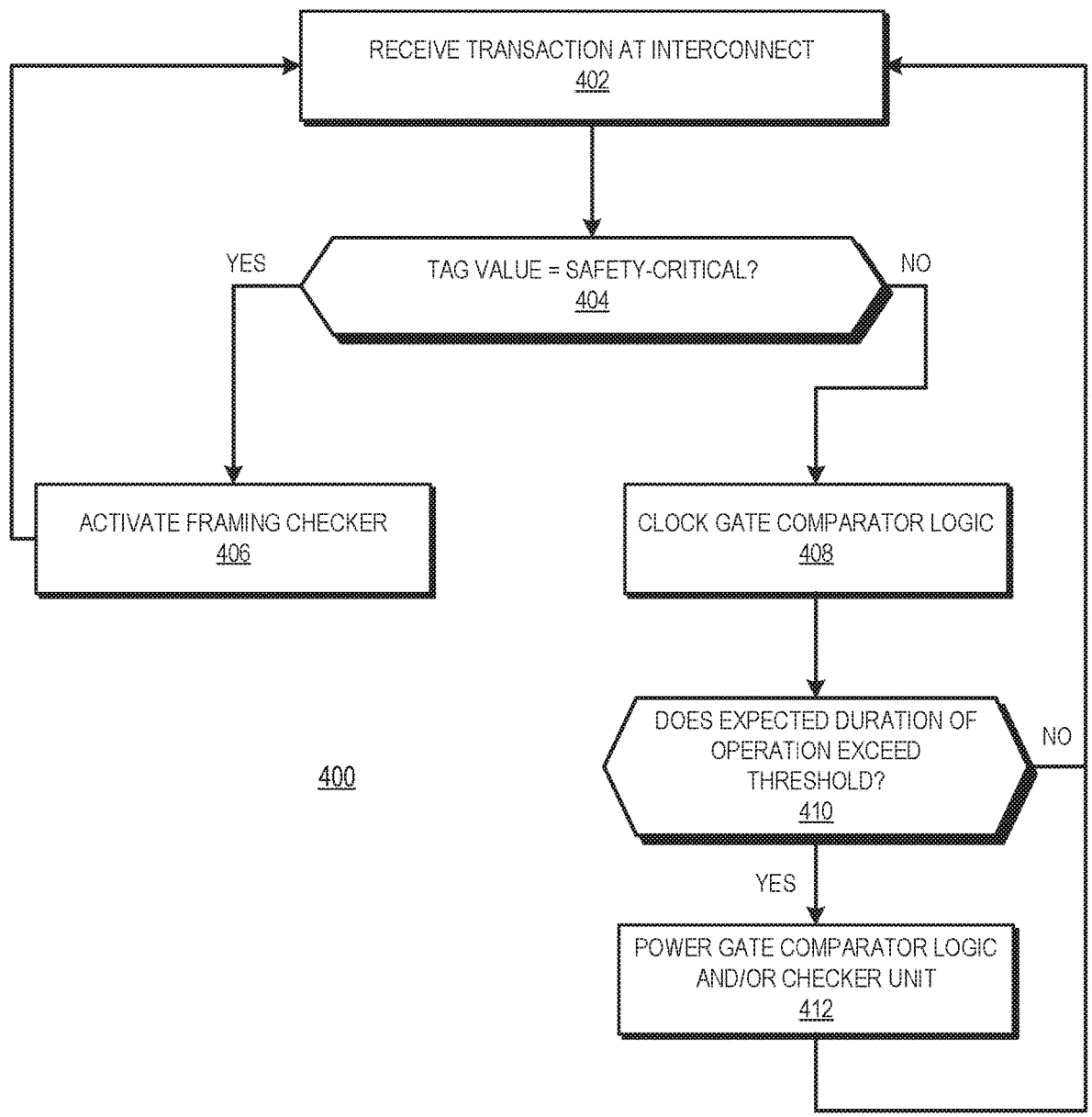
FIG. 4 is a flow diagram of a method of selectively suppressing error detection and correction in accordance with some embodiments.

FIG. 4 is a flow diagram of a method 400 of selectively suppressing error detection in accordance with some embodiments. At block 402, the interconnect 102 receives a transaction packet that includes a tag indicating safety-criticality of the associated transaction 140. At block 404, the interconnect 102 identifies whether the tag 142 indicates that the associated transaction 140 is safety-critical. If the tag 142 indicates that the associated transaction 140 is safety-critical, the method flow continues to block 406. At block 406, the interconnect 102 activates the framing checker 114 and comparator logic 116. The method flow then returns back to block 402.

If, at block 404, the tag 142 indicates that the associated transaction 140 is non-safety-critical, the method flow continues to block 408. At block 408, the interconnect 102 suppresses activation of one or both of the framing checker 114 and the comparator logic 116. In some embodiments, the interconnect 102 suppresses activation by clock gating one or more of the comparator logic 116, the framing checker 114, the comparator logic 136, and the routing checker 134. At block 410, the interconnect 102 identifies whether the expected duration of execution of the operations invoked by the transaction 140 exceeds a threshold. If the interconnect 102 determines that the expected duration of execution of the operations does not exceed the threshold, the method flow returns to block 402. If the interconnect 102 determines that the expected duration of execution of the operations exceeds the threshold, the method flow continues to block 412. At block 412, the interconnect shuts power to (for example, by power gating) one or more of the comparator logic 116, the framing checker 114, the comparator logic 136, and the routing checker 134. The method flow then returns to block 402.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   at a first compute element of an interconnect in a processing system, in response to receipt of a transaction packet by the interconnect, executing a first framing operation on the transaction packet to generate a first framing output from the interconnect;
   at the interconnect, based on a tag value associated with the transaction packet, the tag value indicating whether a transaction specified in the transaction packet is safety-critical, selectively activating a second compute element of the interconnect to execute the first framing operation to generate a second framing output and selectively activating a third compute element of the interconnect to compare the first framing output and the second framing output, wherein the second compute element is activated at least one clock cycle after the first compute element executes the first framing operation; and
   at the interconnect, indicating an error to a safety controller of the processing system in response to the third compute element detecting a mismatch between the first framing output and the second framing output.

2. The method of claim 1, wherein the tag value is communicated to the interconnect via a sideband signal or bus.

3. The method of claim 1, wherein selectively activating comprises suppressing activating the third compute element in response to the tag value indicating that the first framing operation is not safety-critical.

4. The method of claim 3, wherein selectively activating further comprises suppressing activating the second compute element in response to the tag value indicating that the first framing operation is not safety-critical.

5. The method of claim 3, wherein suppressing activating comprises clock gating the third compute element.

6. The method of claim 1, further comprising:
   at the interconnect of the processor, selectively power gating at least one of the second compute element and the third compute element in response to the tag value indicating that the first framing operation is not safety-critical and that execution of the first framing operation will require more than a threshold amount of time.

7. The method of claim 1, wherein the tag value is automatically generated based on a memory location associated with the first framing operation.

8. The method of claim 1, further comprising:
   at the safety controller of the processor, generating an interrupt or system reset in response to receiving the indication of an error from the interconnect.

9. A method, comprising:
   at a first compute element of an interconnect of a processing system, in response to an instruction, executing a first framing operation to generate a first framing output; and
   selectively suppressing a second compute element of the interconnect from executing the first framing operation to generate a second framing output and selectively suppressing a third compute element of the interconnect from comparing the first framing output and the second framing output in response to a tag value associated with the instruction, the tag value indicating that the first framing operation is not safety-critical; and
   at the interconnect, selectively power gating at least one of the second compute element and the third compute element in response to the tag value indicating that the first framing operation is not safety-critical and that execution of the first framing operation will require more than a threshold amount of time.

10. The method of claim 9, wherein the tag value is communicated to the interconnect via a sideband signal or bus.

11. The method of claim 9, wherein suppressing comprises clock gating the third compute element.

12. The method of claim 9, wherein the tag value is automatically generated based on a memory location associated with the first framing operation.

13. A processing system, comprising:
a safety controller; and
an interconnect comprising:
- a first compute element to execute a first framing operation to generate a first framing output in response to an instruction;
- a second compute element to execute the first framing operation at least one clock cycle after the first compute element executes the first framing operation to generate a second framing output; and
- a third compute element to compare the first framing output and the second framing output,
- wherein the interconnect is to selectively activate the second compute element and the third compute element in response to a tag value associated with the instruction, the tag value indicating whether the first framing operation is safety-critical, and is to assert a signal to the safety controller in response to detecting a mismatch between the first framing output and the second framing output, wherein the second compute element is activated at least one clock cycle after the first compute element executes the first framing operation.

14. The processor of claim 13, wherein the tag value is communicated to the interconnect via a sideband signal or bus.

15. The processing system of claim 13, wherein the interconnect is to selectively activate by suppressing activating the third compute element in response to the tag value indicating that the first framing operation is not safety-critical.

16. The processing system of claim 15, wherein the interconnect is to selectively activate by suppressing activating the second compute element in response to the tag value indicating that the first framing operation is not safety-critical.

17. The processing system of claim 15, wherein the interconnect is to suppress activating by clock gating the third compute element.

18. The processing system of claim 13, wherein the interconnect is to selectively power gate at least one of the second compute element and the third compute element in response to the tag value indicating that the first framing operation is not safety-critical and that execution of the first framing operation will require more than a threshold amount of time.

* * * * *